(12) United States Patent
Jiang et al.

(10) Patent No.: US 11,785,618 B2
(45) Date of Patent: Oct. 10, 2023

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 53 days.

(21) Appl. No.: 17/542,510

(22) Filed: Dec. 6, 2021

(65) Prior Publication Data

US 2022/0182976 A1 Jun. 9, 2022

(30) Foreign Application Priority Data

Dec. 7, 2020 (CN) .......................... 202011417481.8

(51) Int. Cl.
| | |
|---|---|
| *H04W 72/30* | (2023.01) |
| *H04W 72/0446* | (2023.01) |
| *H04L 5/00* | (2006.01) |
| *H04L 1/1812* | (2023.01) |
| *H04W 72/0453* | (2023.01) |

(52) U.S. Cl.
CPC ............ *H04W 72/30* (2023.01); *H04L 1/1812* (2013.01); *H04L 5/0053* (2013.01); *H04W 72/0446* (2013.01); *H04W 72/0453* (2013.01)

(58) Field of Classification Search
CPC ............. H04W 72/30; H04W 72/0446; H04W 72/0453; H04L 1/1812; H04L 5/0053; H04L 1/1822; H04L 1/1896; H04L 1/1861; H04L 2001/0093; H04L 1/0027; H04L 1/1806
See application file for complete search history.

(56) References Cited

U.S. PATENT DOCUMENTS

| | | | |
|---|---|---|---|
| 2020/0106566 A1* | 4/2020 | Yeo ..................... | H04W 28/04 |
| 2022/0046588 A1* | 2/2022 | Yeo ..................... | H04W 4/06 |
| 2023/0049739 A1* | 2/2023 | Yang ................... | H04L 5/0078 |

* cited by examiner

*Primary Examiner* — Charles C Jiang
*Assistant Examiner* — Debebe A Asefa

(57) ABSTRACT

A method and a device in nodes used for wireless communication are disclosed by the present disclosure. The node receives a first signaling and a first signal; and then transmits a first bit block in a first time-frequency resource set; the first signaling is used to determine time-frequency resources occupied by the first signal, the first bit block comprises a first information block, which is used to indicate whether the first signal is correctly received; the first signaling is used to determine the first time-frequency resource set; a target index is equal to one of the K1 candidate indexes, and is used to determine a position of the first information block in the first bit block. The present disclosure optimizes the system performance by improving the method and device for feedback information transmission in multicast/groupcast mode.

18 Claims, 4 Drawing Sheets

METHOD AND DEVICE IN NODES USED FOR WIRELESS COMMUNICATION

CROSS REFERENCE TO RELATED APPLICATIONS

This application claims the priority benefit of Chinese Patent Application No. 202011417481.8, filed on Dec. 7, 2020, the full disclosure of which is incorporated herein by reference.

BACKGROUND

Technical Field

The present disclosure relates to transmission methods and devices in wireless communication systems, and in particular to a design scheme and device for uplink feedback in wireless communications.

Related Art

Standards in NR Rel-17 have started discussions about how to support Multicast and Broadcast traffic transmissions within a 5G framework. In traditional Long-Term Evolution (LTE) and Long-Term Evolution Advanced (LTE-A) systems, a base station can provide support to terminals in receiving multicast and groupcast traffics through a Multicast Broadcast Single Frequency Network (MBSFN) and Single-Cell Point-To-Multipoint (SC-PTM) method. The difference between NR-based multicast and broadcast traffics and traditional multicast and broadcast traffics is that the NR will be supportive when a UE receives unicast traffics and multicast/groupcast traffics simultaneously in a slot. Based on such assumptions, the uplink feedback of the UE shall be redesigned.

SUMMARY

At present a terminal is not assumed to receive multiple Physical Downlink Shared Channels (PDSCHs) occupying overlapping time-domain resources simultaneously in a slot in a Bandwidth Part (BWP) of a serving cell. The latest discussion around Point-To-Multipoint (PTM) in Rel-17 noted that in cases when a UE is allowed to receive unicast and multicast/groupcast traffics at the same time in a same slot, consequently, the UE will have to receive two PDSCHs that overlap in time domain simultaneously in a slot. In NR, specifically, in a Hybrid Automatic Repeat reQuest Acknowledgement (HARQ-ACK) Codebook based on Type1, a terminal is required to determine, according to an index of a serving cell occupied by a PDSCH, a position of a HARQ-ACK of the PDSCH in the whole HARQ-ACK Codebook; thus when the terminal supports synchronous receptions of unicast PDSCH and multicast/groupcast PDSCH, the above method of composing the HARQ-ACK Codebook shall be redesigned.

To address the above problem, the present disclosure provides a solution. It should be noted that though the present disclosure only took the PTM communications as a typical or exemplary scenario in the statement above, it is also applicable to other scenarios such as unicast system, where similar technical effects can be achieved. Additionally, the adoption of a unified solution for various scenarios, including but not limited to PTM, contributes to the reduction of hardcore complexity and costs. In the case of no conflict, the embodiments of any node and the characteristics in the embodiments may be applied to any other node, and vice versa. In the case of no conflict, the embodiments of the present disclosure and the characteristics in the embodiments may be combined with each other arbitrarily.

To address the above problem, the present disclosure provides a method and a device for Uplink Control Information (UCI) transmission. It should be noted that without conflict, embodiments in the User Equipment (UE) in the present disclosure and the characteristics of the embodiments are also applicable to a base station, and vice versa. In case of no conflict, though the present disclosure is originally targeted at cellular networks, it is also applicable to Internet of Things (IoT) and Vehicle-to-Everything (V2X). Besides, though originally targeted at multi-carrier communications, the present disclosure can also be used for single-carrier communications. Further, though originally targeted at multicast/groupcast communications, the present disclosure can also be used for unicast communications. And the present disclosure not only applies to terminal-base station scenarios, but also to terminal-terminal ones, terminal-relay ones, Non-Terrestrial Networks (NTN) as well as relay-base station communications, where similar technical effects can be achieved. Additionally, the adoption of a unified solution for various scenarios, including but not limited to terminal-base station scenarios, contributes to the reduction of hardcore complexity and costs.

Furthermore, if no conflict is incurred, embodiments in the first node in the present disclosure and the characteristics of the embodiments are also applicable to a second node, and vice versa. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:
  receiving a first signaling and a first signal; and
  transmitting a first bit block in a first time-frequency resource set, the first bit block being comprised of more than one bit;
  herein, the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, a technical feature of the above method lies in that K1 candidate indexes are configured for a PDSCH in a serving cell, each serving like an index of serving cell in NR, when the UE determines a HARQ-ACK bit corresponding to a PDSCH in a HARQ-ACK codebook, it will, according to the PDSCH's type, determine which of the K1 candidate indexes will be used for determining a position of the HARQ-ACK bit.

In one embodiment, another technical feature of the above method lies in that when two PDSCHs that are overlapping in time domain are respectively used for unicast and multicast/groupcast transmissions, these two PDSCHs are respectively indexes by two different candidate indexes, thus ensuring that HARQ-ACKs of the above PDSCHs are not in conflict with each other in the HARQ-ACK codebook.

In one embodiment, another technical feature of the above method lies in that multiple candidate indexes used for determining the positions of HARQ-ACK bits are configured for a serving cell, so that without much change to the current protocols, Frequency Division Multiplexing (FDM) transmissions between multicast/groupcast and unicast can be realized.

According to one aspect of the present disclosure, a first index is equal to an index of a serving cell to which the first signal belongs, the K1 candidate indexes also comprise a second index, the second index being different from the first index, at least one of a property associated with the first signaling or a property associated with the first signal is used to determine whether the target index is equal to the first index or the second index.

In one embodiment, a technical feature of the above method lies in that when a PDSCH is used for unicast, a serving cell index is still used for determining a position of HARQ-ACK in a HARQ-ACK codebook to guarantee better compatibility with the existing NR system; when a PDSCH is used for multicast/groupcast, an index different from the serving cell index will be used for determining a position of HARQ-ACK in a HARQ-ACK codebook, thus preventing mutual conflicts between multiple HARQ-ACK bits.

According to one aspect of the present disclosure, the property associated with the first signaling comprises an RNTI used for scrambling CRC comprised in the first signaling; the CRC comprised in the first signaling uses a C-RNTI for scrambling and the target index is the first index, or the CRC comprised in the first signaling uses a given RNTI for scrambling and the target index is the second index.

In one embodiment, a technical feature of the above method lies in that a target index to be adopted is determined according to a Radio Network Temporary Identity (RNTI) scrambling CRC of a Physical Downlink Control Channel (PDCCH), namely, when a multicast/groupcast-specific RNTI is adopted, a second index is used for HARQ-ACK determination.

According to one aspect of the present disclosure, the property associated with the first signaling comprises a time-frequency resource pool to which time-frequency resources occupied by the first signaling belong; the time-frequency resources occupied by the first signaling belong to a first time-frequency resource pool and the target index is the first index, or the time-frequency resources occupied by the first signaling belong to a second time-frequency resource pool and the target index is the second index; an identifier employed by the first time-frequency resource pool is different from an identifier employed by the second time-frequency resource pool.

In one embodiment, a technical feature of the above method lies in that a target index to be adopted is determined according to the time-frequency resource pool occupied by a PDCCH, namely, when the PDCCH belongs to a time-frequency resource pool dedicated to multicast/groupcast, a second index is used for HARQ-ACK determination.

According to one aspect of the present disclosure, the property associated with the first signal comprises a traffic type of the first signal; the traffic type of the first signal does not comprise multicast traffics and the target index is the first index, or the traffic type of the first signal comprises multicast traffics and the target index is the second index.

In one embodiment, a technical feature of the above method lies in that a target index to be adopted is determined according to the traffic type in a PDSCH, namely, when the PDSCH is used for multicast/groupcast traffics, a second index is used for HARQ-ACK determination.

According to one aspect of the present disclosure, the first bit block comprises Q1 HARQ-ACK information blocks, and the Q1 HARQ-ACK information blocks are respectively used to indicate whether Q1 first-type signals are correctly received, the first signal being one of the Q1 first-type signals, Q1 being a positive integer greater than 1; the target index is used to determine a position of the first information block in the Q1 HARQ-ACK information blocks.

According to one aspect of the present disclosure, comprising:

receiving a second signaling and a second signal;

herein, the second signaling comprises configuration information of the second signal, the first bit block carries a second information block, and the second information block is used to indicate whether the second signal is correctly received; frequency-domain resources occupied by the second signal and frequency-domain resources occupied by the first signal belong to a same serving cell; there is at least one OFDM symbol belonging to time-domain resources occupied by the first signal and time-domain resources occupied by the second signal simultaneously; the first index is used to determine a position of the second information block in the first bit block.

According to one aspect of the present disclosure, comprising:

receiving a third signaling;

herein, the third signaling is used to indicate K1 candidate indexes.

According to one aspect of the present disclosure, the K1 candidate indexes are respectively equal to K1 integers, the K1 integers are arranged sequentially in an ascending order, and the K1 integers are associated with K1 first-type identifiers; a serving cell to which the first signal belongs comprises K1 spatial resource sets, or a serving cell to which the first signaling belongs comprises K1 spatial resource sets; the K1 spatial resource sets are respectively associated with the K1 first-type identifiers.

The present disclosure provides a method in a second node for wireless communications, comprising:

transmitting a first signaling and a first signal; and receiving a first bit block in a first time-frequency resource set, the first bit block being comprised of more than one bit;

herein, the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

According to one aspect of the present disclosure, a first index is equal to an index of a serving cell to which the first signal belongs, the K1 candidate indexes also comprise a second index, the second index being different from the first index, at least one of a property associated with the first signaling or a property associated with the first signal is used to determine whether the target index is equal to the first index or the second index.

According to one aspect of the present disclosure, the property associated with the first signaling comprises an RNTI used for scrambling CRC comprised in the first signaling; the CRC comprised in the first signaling uses a C-RNTI for scrambling and the target index is the first index, or the CRC comprised in the first signaling uses a given RNTI for scrambling and the target index is the second index.

According to one aspect of the present disclosure, the property associated with the first signaling comprises a time-frequency resource pool to which time-frequency resources occupied by the first signaling belong; the time-frequency resources occupied by the first signaling belong to a first time-frequency resource pool and the target index is the first index, or the time-frequency resources occupied by the first signaling belong to a second time-frequency resource pool and the target index is the second index; an identifier employed by the first time-frequency resource pool is different from an identifier employed by the second time-frequency resource pool.

According to one aspect of the present disclosure, the property associated with the first signal comprises a traffic type of the first signal; the traffic type of the first signal does not comprise multicast traffics and the target index is the first index, or the traffic type of the first signal comprises multicast traffics and the target index is the second index.

According to one aspect of the present disclosure, the first bit block comprises Q1 HARQ-ACK information blocks, and the Q1 HARQ-ACK information blocks are respectively used to indicate whether Q1 first-type signals are correctly received, the first signal being one of the Q1 first-type signals, Q1 being a positive integer greater than 1; the target index is used to determine a position of the first information block in the Q1 HARQ-ACK information blocks.

According to one aspect of the present disclosure, comprising:
transmitting a second signaling and a second signal;
herein, the second signaling comprises configuration information of the second signal, the first bit block carries a second information block, and the second information block is used to indicate whether the second signal is correctly received; frequency-domain resources occupied by the second signal and frequency-domain resources occupied by the first signal belong to a same serving cell; there is at least one OFDM symbol belonging to time-domain resources occupied by the first signal and time-domain resources occupied by the second signal simultaneously; the first index is used to determine a position of the second information block in the first bit block.

According to one aspect of the present disclosure, comprising:
transmitting a third signaling;
herein, the third signaling is used to indicate K1 candidate indexes.

According to one aspect of the present disclosure, the K1 candidate indexes are respectively equal to K1 integers, the K1 integers are arranged sequentially in an ascending order, and the K1 integers are associated with K1 first-type identifiers; a serving cell to which the first signal belongs comprises K1 spatial resource sets, or a serving cell to which the first signaling belongs comprises K1 spatial resource sets; the K1 spatial resource sets are respectively associated with the K1 first-type identifiers.

The present disclosure provides a first node for wireless communications, comprising:
a first receiver, receiving a first signaling and a first signal;
a first transmitter, transmitting a first bit block in a first time-frequency resource set, the first bit block being comprised of more than one bit;
herein, the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

The present disclosure provides a second node for wireless communications, comprising:
a second transmitter, transmitting a first signaling and a first signal;
a second receiver, receiving a first bit block in a first time-frequency resource set, the first bit block being comprised of more than one bit;
herein, the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, compared with the prior art, the present disclosure is advantageous in the following aspects:
configuring K1 candidate indexes for a PDSCH in a serving cell, where the K1 candidate indexes play a role as much as an index of serving cell in NR, when a UE determines a HARQ-ACK bit corresponding to a PDSCH in a HARQ-ACK codebook, it will determine which one of the K1 candidate indexes is to be used for determining a position of the HARQ-ACK bit depending on the type of the PDSCH;
when there are two time-domain overlapping PDSCHs respectively being used for unicast and multicast/groupcast transmissions, the two PDSCHs correspond to two different candidate indexes respectively, thereby ensuring that HARQ-ACKs of these two PDSCHs won't conflict with each other in a HARQ-ACK codebook;
configuring multiple candidate indexes for a serving cell used to determine a position of a HARQ-ACK bit, thereby ensuring the implementation of FDM transmissions between multicast/groupcast and unicast with little change to protocols.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
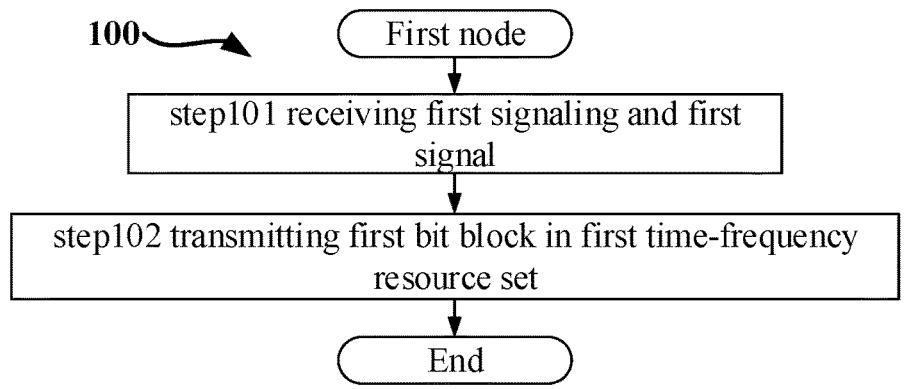
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, a first node in the present disclosure receives a first signaling and a first signal in step 101; and transmits a first bit block in a first time-frequency resource set in step 102.

In Embodiment 1, the first bit block is comprised of more than one bit; the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, the first signaling is a piece of Downlink Control Information (DCI).

In one embodiment, the first signaling is a piece of Sidelink Control Information (SCI).

In one embodiment, a physical layer channel bearing the first signaling comprises a PDCCH.

In one embodiment, a physical layer channel bearing the first signaling comprises a Physical Sidelink Control Channel (PSCCH).

In one embodiment, the first signaling is a Radio Resource Control (RRC) signaling.

In one embodiment, the first signaling is a Higher Layer Signaling.

In one embodiment, the first signaling is a Downlink (DL) Grant.

In one embodiment, the first signaling is used to schedule the first signal.

In one embodiment, the first signaling comprises configuration information of the first signal, and the configuration information of the first signal is comprised of at least one of frequency-domain resources occupied by the first signal, time-domain resources occupied by the first signal, a Modulation and Coding Scheme (MCS) adopted by the first signal, a Hybrid Automatic Repeat reQuest (HARQ) process number employed by the first signal or a Redundancy Version (RV) adopted by the first signal.

In one embodiment, the first signal is a radio signal.

In one embodiment, the first signal is a baseband signal.

In one embodiment, a physical layer channel bearing the first signal comprises a PDSCH.

In one embodiment, a physical layer channel bearing the first signal comprises a Physical Sidelink Shared Channel (PSSCH).

In one embodiment, a transmission channel bearing the first signal comprises a Downlink Shared Channel (DL-SCH).

In one embodiment, a transmission channel bearing the first signal comprises a Sidelink Shared Channel (SL-SCH).

In one embodiment, the first signal is generated by a Transport Block (TB).

In one embodiment, the first signal is generated by a Code Block Group (CBG).

In one embodiment, the first signaling is used to indicate time-domain resources occupied by the first time-frequency resource set.

In one embodiment, the first signaling is used to indicate frequency-domain resources occupied by the first time-frequency resource set.

In one embodiment, the first time-frequency resource set is a Physical Uplink Control Channel (PUCCH) resource.

In one embodiment, the first time-frequency resource set is used for transmission of a Physical Uplink Shared Channel (PUSCH).

In one embodiment, the first bit block is a piece of Uplink Control Information (UCI).

In one embodiment, the first bit block comprises more than one HARQ-ACK bit.

In one embodiment, the information block comprises 1 information bit, and the 1 information bit comprised in the first information block is used to indicate whether the first signal is correctly received.

In one embodiment, the information block comprises W1 information bits, W1 being a positive integer greater than 1, and the W1 information bits comprised in the first information block are used to indicate whether the first signal is correctly received.

In one embodiment, the above phrase of "a serving cell to which the first signal belongs" means a serving cell to which frequency-domain resources occupied by the first signal belong.

In one embodiment, the above phrase of "a serving cell to which the first signal belongs" means a serving cell to which a BWP occupied by the first signal belongs.

In one embodiment, the above phrase of "a serving cell to which the first signal belongs" means a serving cell indicated by a Carrier Indicator Field (CIF) in the first signaling scheduling the first signal.

In one embodiment, an index of the serving cell to which the first signal belongs is a ServCellIndex.

In one embodiment, an index of the serving cell to which the first signal belongs is a ServCellId.

In one embodiment, an index of the serving cell to which the first signal belongs is a ServCellIdentity.

In one embodiment, an index of the serving cell to which the first signal belongs is a non-negative integer.

In one subembodiment, the non-negative integer is less than 8.

In one subembodiment, the non-negative integer is less than 32.

In one embodiment, an index of a serving cell to which the first signal belongs is a first index of the K1 candidate indexes.

In one embodiment, any of the K1 candidate indexes is a non-negative integer.

In one embodiment, the first bit block comprises Q1 first-type information blocks, Q1 being a positive integer greater than 1, the first information block being one of the Q1 first-type information blocks, the Q1 first-type information blocks are sequentially mapped into the first bit block, and the target index is used to determine a position of the first information block in the Q1 first-type information blocks.

Embodiment 2

Figure 2:
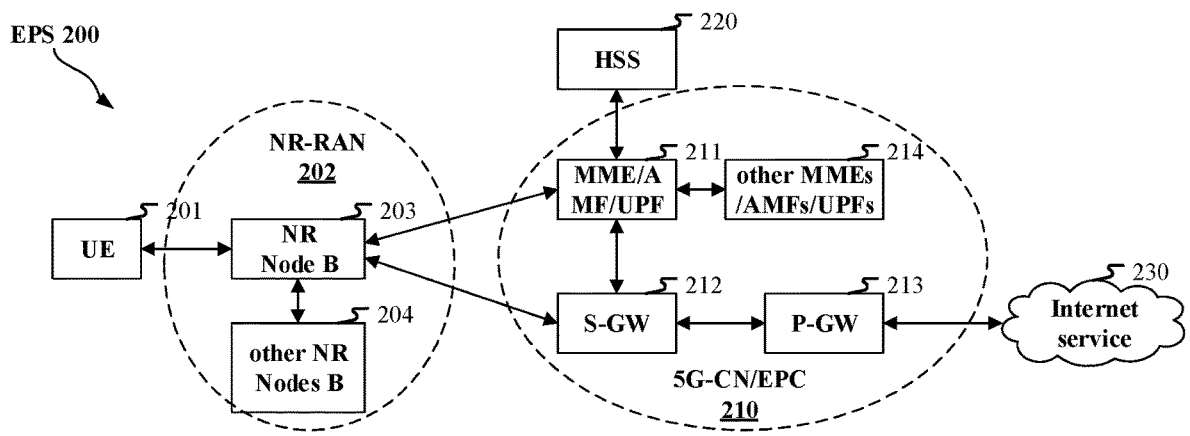
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 is a terminal with the capability of supporting unicast traffics and multi-cast and groupcast traffics simultaneously.

In one embodiment, the UE 201 can support receiving two time-domain overlapping PDSCHs synchronously in a carrier.

In one embodiment, the gNB 203 corresponds to the second node in the present disclosure.

In one embodiment, the gNB 203 is a base station with the capability of supporting unicast traffics and multi-cast and groupcast traffics simultaneously.

In one embodiment, the gNB 203 can support receiving two time-domain overlapping PDSCHs synchronously in a carrier.

Embodiment 3

Figure 3:
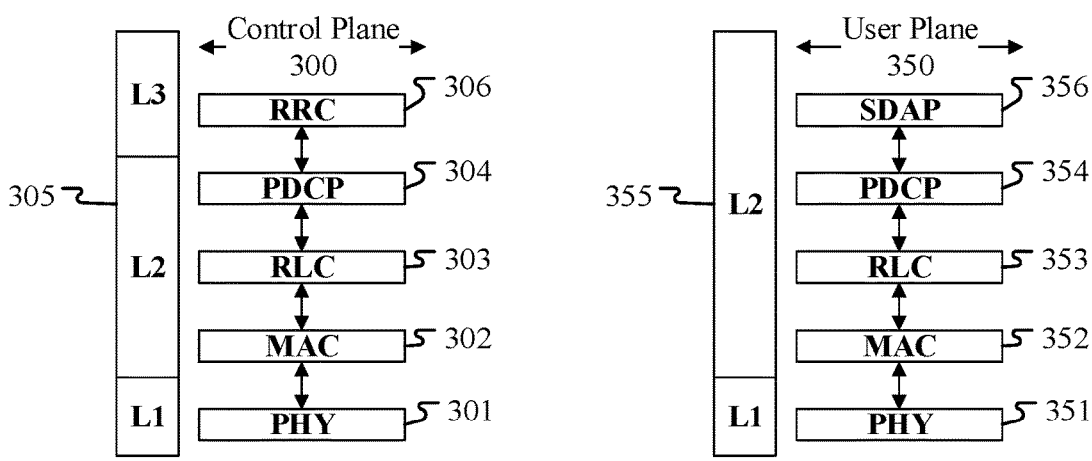
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP304 of the second communication node is used for generating scheduling of the first communication node.

In one embodiment, the PDCP354 of the second communication node is used for generating scheduling of the first communication node.

In one embodiment, the first signaling in the present disclosure is generated by the PHY301 or the PHY351.

In one embodiment, the first signaling in the present disclosure is generated by the MAC302 or the MAC352.

In one embodiment, the first signaling in the present disclosure is generated by the RRC306.

In one embodiment, the second signaling in the present disclosure is generated by the PHY301 or the PHY351.

In one embodiment, the second signaling in the present disclosure is generated by the MAC302 or the MAC352.

In one embodiment, the second signaling in the present disclosure is generated by the RRC306.

In one embodiment, the first signal in the present disclosure is generated by the PHY301 or the PHY351.

In one embodiment, the first signal in the present disclosure is generated by the MAC302 or the MAC352.

In one embodiment, the first signal in the present disclosure is generated by the RRC306.

In one embodiment, the second signal in the present disclosure is generated by the PHY301 or the PHY351.

In one embodiment, the second signal in the present disclosure is generated by the MAC302 or the MAC352.

In one embodiment, the second signal in the present disclosure is generated by the RRC306.

In one embodiment, the third signaling in the present disclosure is generated by the PHY301 or the PHY351.

In one embodiment, the third signaling in the present disclosure is generated by the MAC302 or the MAC352.

In one embodiment, the third signaling in the present disclosure is generated by the RRC306.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a cell.

In one embodiment, the second node is an eNB.

In one embodiment, the second node is a base station.

In one embodiment, the second node is used for management over multiple base stations.

In one embodiment, the second node is a node for management over multiple cells.

In one embodiment, the second node is used for management over multiple TRPs.

Embodiment 4

Figure 4:
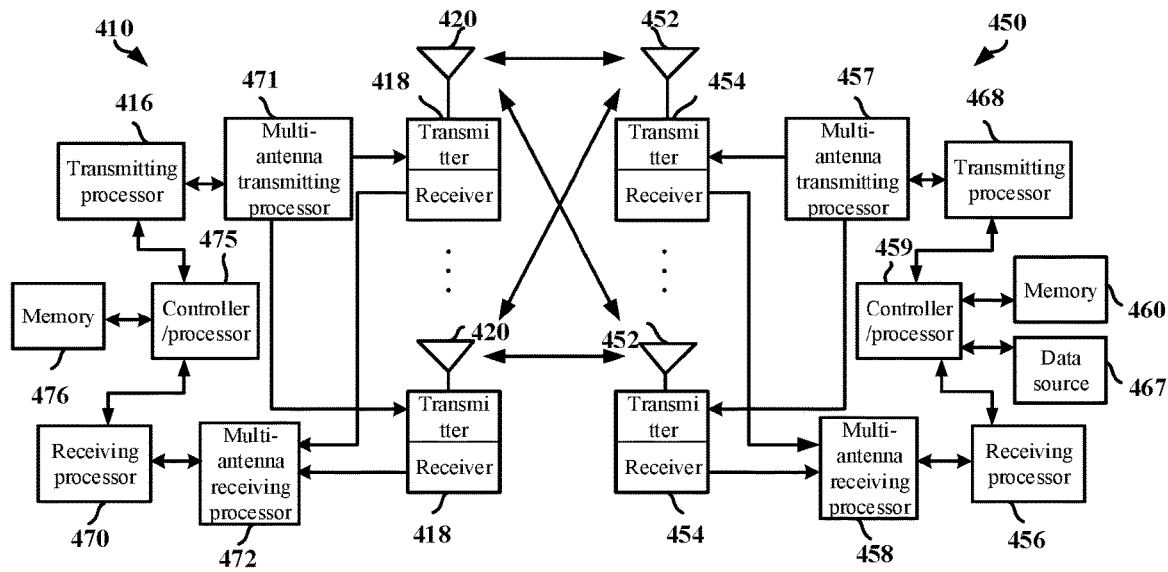
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling and a first signal; and transmits a first bit block in a first time-frequency resource set, the first bit block being comprised of more than one bit; herein, the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, the first communication device 450 comprises a memory that stores a computer readable instruction program. The computer readable instruction program generates actions when executed by at least one processor. The actions include: receiving a first signaling and a first signal; and transmitting a first bit block in a first time-frequency resource set, the first bit block being comprised of more than one bit; herein, the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling and a first signal; and receives a first bit block in a first time-frequency resource set, the first bit block being comprised of more than one bit; herein, the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, the second communication device 410 comprises a memory that stores a computer readable instruction program. The computer readable instruction program generates actions when executed by at least one processor. The actions include: transmitting a first signaling and a first signal; and receiving a first bit block in a first time-frequency resource set, the first bit block being comprised of more than one bit; herein, the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is network equipment.

In one embodiment, the second communication device 410 is a serving cell.

In one embodiment, the second communication device 410 is a TRP.

In one embodiment, at least the first four of the antenna 452, the receiver 454, the multi-antenna receiving processor 458, the receiving processor 456, and the controller/processor 459 are used for receiving a first signaling and a first signal; at least the first four of the antenna 420, the transmitter 418, the multi-antenna transmitting processor 471, the transmitting processor 416 and the controller/processor 475 are used for transmitting a first signaling and a first signal.

In one embodiment, at least the first four of the antenna 452, the transmitter 454, the multi-antenna transmitting processor 457, the transmitting processor 468, and the controller/processor 459 are used for transmitting a first bit block in a first time-frequency resource set; at least the first four of the antenna 420, the receiver 418, the multi-antenna receiving processor 472, the receiving processor 470 and the controller/processor 475 are used for receiving a first bit block in a first time-frequency resource set.

In one embodiment, at least the first four of the antenna 452, the receiver 454, the multi-antenna receiving processor 458, the receiving processor 456, and the controller/processor 459 are used for receiving a second signaling and a second signal; at least the first four of the antenna 420, the transmitter 418, the multi-antenna transmitting processor 471, the transmitting processor 416 and the controller/processor 475 are used for transmitting a second signaling and a second signal.

In one embodiment, at least the first four of the antenna 452, the receiver 454, the multi-antenna receiving processor 458, the receiving processor 456, and the controller/processor 459 are used for receiving a third signaling; at least the first four of the antenna 420, the transmitter 418, the multi-antenna transmitting processor 471, the transmitting processor 416 and the controller/processor 475 are used for transmitting a third signaling.

Embodiment 5

Figure 5:
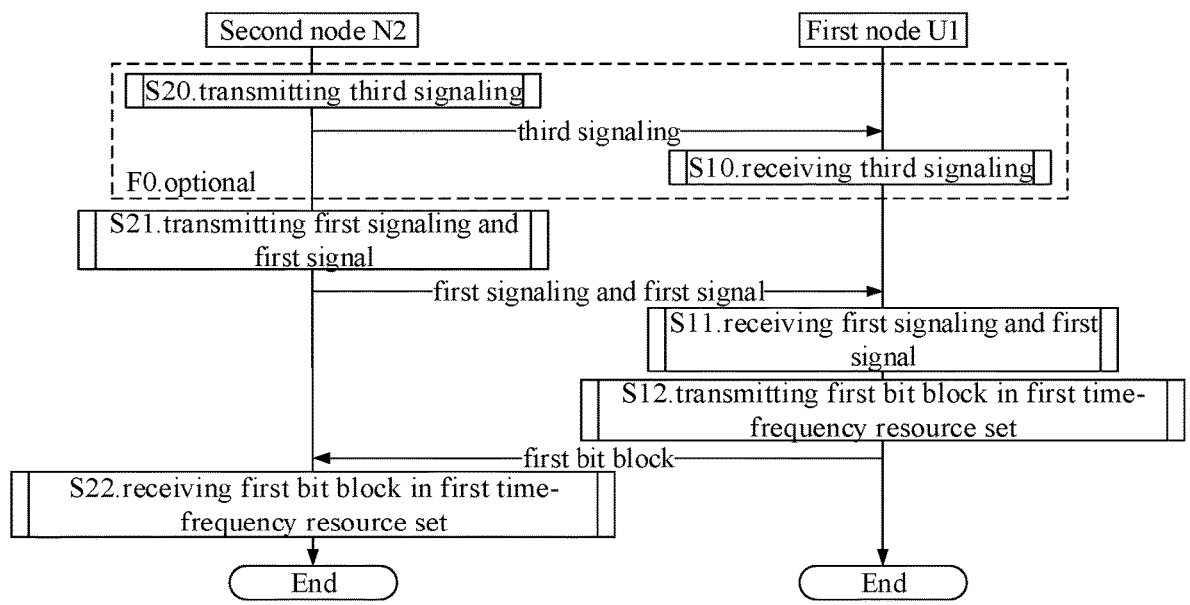
FIG. 5 illustrates a flowchart of a first signaling and a first signal according to one embodiment of the present disclosure.

Embodiment 5 illustrates a flowchart of a first signaling and a first signal, as shown in FIG. 5. In FIG. 5, a first node U1 and a second node N2 are in communications via a radio link. Herein, steps marked by the box F0 are optional. It should be particularly noted that the sequence illustrated in this figure does not set any limit on the order of signal transmissions and implementations in the present disclosure.

The first node U1 receives a third signaling in step S10; receives a first signaling and a first signal in step S11; and transmits a first bit block in a first time-frequency resource set in step S12.

The second node N2 transmits a third signaling in step S20; transmits a first signaling and a first signal in step S21; and receives a first bit block in a first time-frequency resource set in step S22.

In Embodiment 5, the first bit block is comprised of more than one bit; the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes; the third signaling is used to indicate K1 candidate indexes.

In one embodiment, a first index is equal to an index of a serving cell to which the first signal belongs, the K1 candidate indexes also comprise a second index, the second index being different from the first index, at least one of a property associated with the first signaling or a property associated with the first signal is used to determine whether the target index is equal to the first index or the second index.

In one subembodiment, the first index is a ServCellIndex.
In one subembodiment, the first index is a ServCellId.
In one subembodiment, the first index is a ServCellIdentity.
In one subembodiment, the first index is a non-negative integer.

In one subembodiment, the second index is a non-negative integer.

In one subembodiment, the second index is equal to a sum of the first index and a first integer, the first integer being a non-negative integer greater than 0.

In one subsidiary embodiment of the above subembodiment, the first integer is equal to 1.

In one subsidiary embodiment of the above subembodiment, the first integer is equal to 16.

In one subsidiary embodiment of the above subembodiment, the first integer is fixed.

In one subsidiary embodiment of the above subembodiment, the first integer is configured by an RRC signaling.

In one subembodiment, the property associated with the first signaling comprises: whether the first signaling is unicast or groupcast.

In one subsidiary embodiment of the above subembodiment, the first signaling is unicast and the target index is equal to the first index, or the first signaling is groupcast and the target index is equal to the second index.

In one subembodiment, the property associated with the first signaling comprises: whether the first signaling is transmitted through single TRP or multiple TRPs.

In one subsidiary embodiment of the above subembodiment, the first signaling is transmitted through single TRP and the target index is equal to the first index, or the first signaling is transmitted through multiple TRPs and the target index is equal to the second index.

In one subembodiment, the property associated with the first signaling comprises: whether the first signaling adopts a format of DCI or a format of SCI.

In one subsidiary embodiment of the above subembodiment, the first signaling adopts a first DCI format and the target index is equal to the first index, or the first signaling adopts a second DCI format and the target index is equal to the second index; the first DCI format is different from the second DCI format.

In one subsidiary embodiment of the above subembodiment, the first signaling adopts a first SCI format and the target index is equal to the first index, or the first signaling adopts a second SCI format and the target index is equal to the second index; the first SCI format is different from the second SCI format.

In one subembodiment, the property associated with the first signaling comprises: a transmission method adopted by the first signaling.

In one subsidiary embodiment of the above subembodiment, the first signaling adopts a single transmission and the target index is equal to the first index, or the first signaling adopts repeated transmissions and the target index is equal to the second index.

In one subembodiment, the property associated with the first signaling comprises: a type of a logical channel bearing the first signal.

In one subsidiary embodiment of the above subembodiment, the logical channel bearing the first signal is not a Multicast Traffic Channel (MTCH) or a Multicast Control Channel (MCCH), and the target index is equal to the first index; or the logical channel bearing the first signal is at least one of a MTCH or a MCCH, and the target index is equal to the second index.

In one subsidiary embodiment of the above subembodiment, the logical channel bearing the first signal is not a Single Carrier Multicast Traffic Channel (SC-MTCH) or a Single Carrier Multicast Control Channel (SC-MCCH), and the target index is equal to the first index; or the logical channel bearing the first signal is at least one of a SC-MTCH or a SC-MCCH, and the target index is equal to the second index.

In one subembodiment, the property associated with the first signaling comprises: a type of a transport channel bearing the first signal.

In one subsidiary embodiment of the above subembodiment, the transport channel bearing the first signal is a DL-SCH and the target index is equal to the first index; or the transport channel bearing the first signal is an MCH and the target index is equal to the second index.

In one subsidiary embodiment of the above subembodiment, the transport channel bearing the first signal is a DL-SCH and the target index is equal to the first index; or the transport channel bearing the first signal is a Single Carrier Multicast Channel (SC-MCH) and the target index is equal to the second index.

In one subembodiment, the property associated with the first signaling comprises: a transmission method adopted by the first signal.

In one subsidiary embodiment of the above subembodiment, the first signal is transmitted for a single time in a base station and the target index is the first index, or the first signal is transmitted for multiple times in multiple base stations and the target index is equal to the second index.

In one subsidiary embodiment of the above subembodiment, the first signal adopts the transmission method of Non-Single Frequency Network (Non-SFN) and the target index is the first index, or the first signal adopts the transmission method of SFN and the target index is equal to the second index.

In one embodiment, the property associated with the first signaling comprises a Radio Network Temporary Identifier (RNTI) employed for scrambling Cyclic Redundancy Check (CRC) comprised in the first signaling; the first signaling employs a Cell Radio Network Temporary Identifier (C-RNTI) for scrambling and the target index is the first index, or the first signaling employs a given RNTI for scrambling and the target index is the second index.

In one subembodiment, the given RNTI is a Single Carrier Radio Network Temporary Identifier (SC-RNTI).

In one subembodiment, the given RNTI is a Group Radio Network Temporary Identifier (G-RNTI).

In one subembodiment, the given RNTI is a Group Common Radio Network Temporary Identifier (GC-RNTI).

In one subembodiment, the given RNTI is a Single Carrier Point to Multipoint Radio Network Temporary Identifier (SC-PTM-RNTI).

In one subembodiment, the given RNTI is a Single Carrier Single Frequency Network Radio Network Temporary Identifier (SC-SFN-RNTI).

In one embodiment, the property associated with the first signaling comprises a time-frequency resource pool to which time-frequency resources occupied by the first signaling belong; the time-frequency resources occupied by the first signaling belong to a first time-frequency resource pool and the target index is the first index, or the time-frequency resources occupied by the first signaling belong to a second time-frequency resource pool and the target index is the second index; an identifier employed by the first time-frequency resource pool is different from an identifier employed by the second time-frequency resource pool.

In one subembodiment, the first time-frequency resource pool is a Control Resource Set (CORESET).

In one subembodiment, the identifier employed by the first time-frequency resource pool is a ControlResourceSetId.

In one subembodiment, the second time-frequency resource pool is a CORESET.

In one subembodiment, the identifier employed by the second time-frequency resource pool is a ControlResourceSetId.

In one subembodiment, the first time-frequency resource pool is a Search Space Set.

In one subembodiment, the identifier employed by the first time-frequency resource pool is a SearchSpaceId.

In one subembodiment, the second time-frequency resource pool is a Search Space Set.

In one subembodiment, the identifier employed by the second time-frequency resource pool is a SearchSpaceId.

In one subembodiment, the first time-frequency resource pool is a Search Space.

In one subembodiment, the second time-frequency resource pool is a Search Space.

In one subembodiment, the first time-frequency resource pool is a CORESET Pool.

In one subembodiment, the identifier employed by the first time-frequency resource pool is a conresetPoolIndex.

In one subembodiment, the second time-frequency resource pool is a CORESET Pool.

In one subembodiment, the identifier employed by the second time-frequency resource pool is a conresetPoolIndex.

In one subembodiment, the second time-frequency resource pool is configured for scheduling multicast/groupcast PDCCH transmission.

In one embodiment, the property associated with the first signal comprises a traffic type of the first signal; the traffic type of the first signal does not comprise multicast traffics and the target index is the first index, or the traffic type of the first signal comprises multicast traffics and the target index is the second index.

In one subembodiment, the multicast traffics comprise PTM service.

In one subembodiment, the multicast traffics comprise Multicast service.

In one subembodiment, the multicast traffics comprise Broadcast service.

In one subembodiment, the multicast traffics comprise Multimedia Broadcast Multicast Service (MBMS).

In one embodiment, CRC comprised in the first signaling employs an RNTI other than the C-RNTI for scrambling and the traffic type of the first signal comprises multicast traffics, the target index is the second index; otherwise, the target index is the first index.

In one embodiment, the time-frequency resources occupied by the first signaling belong to the second time-frequency resource pool in the present disclosure and the traffic type of the first signal comprises multicast traffics, the target index is the second index; otherwise, the target index is the first index.

In one subembodiment, an identifier employed by the second time-frequency resource pool is fixed.

In one subembodiment, an identifier employed by the second time-frequency resource pool is configured by an RRC signaling.

In one subembodiment, an identifier employed by the second time-frequency resource pool is indicated by a MAC CE.

In one subembodiment, the second time-frequency resource pool is used for beating a multicast/groupcast scheduling signaling.

In one embodiment, the first bit block comprises Q1 HARQ-ACK information blocks, and the Q1 HARQ-ACK information blocks are respectively used to indicate whether Q1 first-type signals are correctly received, the first signal being one of the Q1 first-type signals, Q1 being a positive integer greater than 1; the target index is used to determine a position of the first information block in the Q1 HARQ-ACK information blocks.

In one subembodiment, any of the Q1 HARQ-ACK information blocks only comprises one HARQ-ACK information bit.

In one subembodiment, at least one of the Q1 HARQ-ACK information blocks comprises multiple HARQ-ACK information bits.

In one subembodiment, physical layer channels occupied by the Q1 first-type signals are respectively Q1 PDSCHs.

In one subembodiment, transport channels occupied by the Q1 first-type signals are respectively Q1 DL-SCHs.

In one subembodiment, the Q1 first-type signals are respectively generated by Q1 TBs.

In one subembodiment, the Q1 first-type signals are respectively generated by Q1 CBGs.

In one subembodiment, the Q1 first-type signals respectively occupy Q1 different HARQ processes.

In one subembodiment, the Q1 HARQ-ACK information blocks are sequentially mapped in the first bit block.

In one subembodiment, the Q1 first-type signals are sequentially associated with the Q1 HARQ-ACK information blocks in an order of firstly in time domain, then according to Semi-Persistent Scheduling (SPS) PDSCH configuration identifiers and finally according to an employed index.

In one subsidiary embodiment of the above subembodiment, the employed index is one of the K1 candidate indexes.

In one subsidiary embodiment of the above subembodiment, a first-type signal #i and a first-type signal #j are two different first-type signals of the Q1 first-type signals, the first-type signal #i and the first-type signal #j employ a same index, and the first-type signal #i and the first-type signal #j correspond to a same SPS PDSCH configuration index, the first-type signal #i is earlier than the first-type signal #j in time domain, and a position of a HARQ-ACK information block corresponding to the first-type signal #i in the first bit block is later than a position of a HARQ-ACK information block corresponding to the first-type signal #j in the first bit block.

In one subsidiary embodiment of the above subembodiment, a first-type signal #i and a first-type signal #j are two different first-type signals of the Q1 first-type signals, the first-type signal #i and the first-type signal #j employ a same index, and the first-type signal #i and the first-type signal #j correspond to a same SPS PDSCH configuration index, the first-type signal #i is earlier than the first-type signal #j in time domain, and a position of a HARQ-ACK information block corresponding to the first-type signal #i in the first bit block is earlier than a position of a HARQ-ACK information block corresponding to the first-type signal #j in the first bit block.

In one subsidiary embodiment of the above subembodiment, a first-type signal #p and a first-type signal #q are two different first-type signals of the Q1 first-type signals, the first-type signal #p and the first-type signal #q employ a same index, an SPS PDSCH configuration index corresponding to the first-type signal #p is smaller than an SPS PDSCH configuration index corresponding to the first-type signal #q, and a position of a HARQ-ACK information block corresponding to the first-type signal #p in the first bit block is later than a position of a HARQ-ACK information block corresponding to the first-type signal #q in the first bit block.

In one subsidiary embodiment of the above subembodiment, a first-type signal #p and a first-type signal #q are two different first-type signals of the Q1 first-type signals, the first-type signal #p and the first-type signal #q employ a same index, an SPS PDSCH configuration index corresponding to the first-type signal #p is smaller than an SPS PDSCH configuration index corresponding to the first-type signal #q, and a position of a HARQ-ACK information block corresponding to the first-type signal #p in the first bit block is earlier than a position of a HARQ-ACK information block corresponding to the first-type signal #q in the first bit block.

In one subsidiary embodiment of the above subembodiment, a first-type signal #m and a first-type signal #n are two different first-type signals of the Q1 first-type signals, an index employed by the first-type signal #m is smaller than an index employed by the first-type signal #n, and a position of a HARQ-ACK information block corresponding to the first-type signal #m in the first bit block is later than a position of a HARQ-ACK information block corresponding to the first-type signal #n in the first bit block.

In one subsidiary embodiment of the above subembodiment, a first-type signal #m and a first-type signal #n are two different first-type signals of the Q1 first-type signals, an index employed by the first-type signal #m is smaller than an index employed by the first-type signal #n, and a position of a HARQ-ACK information block corresponding to the first-type signal #m in the first bit block is earlier than a position of a HARQ-ACK information block corresponding to the first-type signal #n in the first bit block.

In one embodiment, the third signaling is an RRC signaling.

In one embodiment, the third signaling is a MAC CE.

In one embodiment, the third signaling is a physical layer dynamic signaling.

In one embodiment, the third signaling is DCI.

In one embodiment, the K1 candidate indexes are respectively equal to K1 integers, the K1 integers are arranged sequentially in an ascending order, and the K1 integers are associated with K1 first-type identifiers; a serving cell to which the first signal belongs comprises K1 spatial resource sets, or a serving cell to which the first signaling belongs comprises K1 spatial resource sets; the K1 spatial resource sets are respectively associated with the K1 first-type identifiers.

In one subembodiment, the first signal is associated with a given spatial resource set of the K1 spatial resource sets, or the first signaling is associated with a given spatial resource set of the K1 spatial resource sets; the given spatial resource set corresponds to a given first-type identifier of the K1 first-type identifiers, the given first-type identifier and an index of a serving cell to which the first signal belongs being jointly used to determine a given integer employed by the first signal among the K1 integers, the given integer being equal to a target index employed by the first signal.

In one subsidiary embodiment of the above subembodiment, a sum of the given first-type identifier and the index of the serving cell is equal to the given integer.

In one subsidiary embodiment of the above subembodiment, the phrase that the first signal is associated with a given spatial resource set of the K1 spatial resource sets means that time-frequency resources occupied by the first signal belong to the given spatial resource set.

In one subsidiary embodiment of the above subembodiment, the phrase that the first signaling is associated with a given spatial resource set of the K1 spatial resource sets means that time-frequency resources occupied by the first signaling belong to the given spatial resource set.

In one subembodiment, the K1 spatial resource sets are respectively K1 CORESETs, and the K1 first-type identifiers are respectively K1 ControlResourceSetIds employed by the K1 CORESETs.

In one subembodiment, the K1 spatial resource sets are respectively K1 SearchSpaces, and the K1 first-type identifiers are respectively K1 SearchSpaceIds employed by the K1 SearchSpaces.

In one subembodiment, the K1 spatial resource sets are respectively K1 SearchSpace Sets, and the K1 first-type identifiers are respectively K1 SearchSpaceIds employed by the K1 SearchSpace Sets.

In one subembodiment, the K1 spatial resource sets are respectively K1 CORESET Pools, and the K1 first-type identifiers are respectively K1 coresetPoolIndexes employed by the K1 CORESET Pools.

In one subembodiment, the K1 spatial resource sets are respectively K1 BWPs, and the K1 first-type identifiers are respectively K1 BWP-ids employed by the K1 BWPs.

In one embodiment, the first bit block comprises CSI.

In one embodiment, the first bit block comprises information bits generated by at least one of Channel Quality Information (CQI), a Precoding Matrix Indicator (PMI), a CSI-RS Resource Indicator (CRI), a SS/PBCH Resource Block Indicator (SSBRI), a Layer Indicator (LI), a Rank Indicator (RI), a Precoding Type Indicator (PTI), a L1 Reference Signal Received Power (RSRP), a Reference Signal Received Quality (RSRQ) or a Signal-to-noise and interference ratio (SINR).

Embodiment 6

Figure 6:
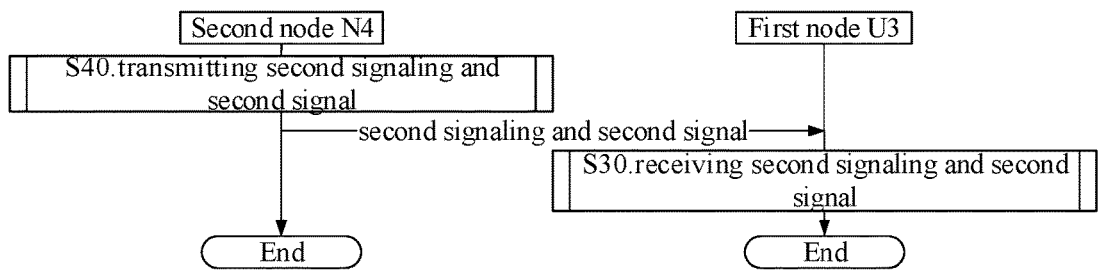
FIG. 6 illustrates a flowchart of a second signaling and a second signal according to one embodiment of the present disclosure.

Embodiment 6 illustrates a flowchart of a second signaling and a second signal, as shown in FIG. 6. In FIG. 6, a first node U3 and a second node N4 are in communication via a radio link. It should be particularly noted that the sequence illustrated in this figure does not set any limit on the order of signal transmissions and implementations in the present disclosure.

The first node U3 receives a second signaling and a second signal in step S30;

The second node N4 transmits a second signaling and a second signal in step S40.

In Embodiment 6, the second signaling comprises configuration information of the second signal, the first bit block carries a second information block, and the second information block is used to indicate whether the second signal is correctly received; frequency-domain resources occupied by the second signal and frequency-domain resources occupied by the first signal belong to a same serving cell; there is at least one Orthogonal Frequency Division Multiplexing (OFDM) symbol belonging to time-domain resources occupied by the first signal and time-domain resources occupied by the second signal simultaneously; the first index is used to determine a position of the second information block in the first bit block.

In one embodiment, the step S30 is taken after the step S11 and before the step S12 in Embodiment 5.

In one embodiment, the step S40 is taken after the step S21 and before the step S22 in Embodiment 5.

In one embodiment, the step S30 is taken before the step S11 in Embodiment 5.

In one embodiment, the step S40 is taken before the step S21 in Embodiment 5.

In one embodiment, the second signaling is a piece of DCI.

In one embodiment, the second signaling is a piece of SCI.

In one embodiment, a physical layer channel bearing the second signaling comprises a PDCCH.

In one embodiment, a physical layer channel bearing the second signaling comprises a PSCCH.

In one embodiment, the second signaling is an RRC signaling.

In one embodiment, the second signaling is a DL Grant.

In one embodiment, the second signaling is used to schedule the second signal.

In one embodiment, the second signaling comprises configuration information of the second signal, and the configuration information of the second signal is comprised of at least one of frequency-domain resources occupied by the second signal, time-domain resources occupied by the second signal, an MCS adopted by the second signal, a HARQ process number employed by the second signal or an RV adopted by the second signal.

In one embodiment, the second signal is a radio signal.

In one embodiment, the second signal is a baseband signal.

In one embodiment, a physical layer channel bearing the second signal comprises a PDSCH.

In one embodiment, a physical layer channel bearing the second signal comprises a PSSCH.

In one embodiment, a transmission channel bearing the second signal comprises a DL-SCH.

In one embodiment, a transmission channel bearing the second signal comprises a SL-SCH.

In one embodiment, the second signal is generated by a TB.

In one embodiment, the second signal is generated by a CBG.

In one embodiment, the first index is used to determine a position of the second information block in the first bit block, and the second index is used to determine a position of the first information block in the first bit block.

In one embodiment, frequency-domain resources occupied by the second signal and frequency-domain resources occupied by the first signal are FDM.

In one embodiment, frequency-domain resources occupied by the second signal and frequency-domain resources occupied by the first signal belong to a same BWP.

In one embodiment, frequency-domain resources occupied by the second signal and frequency-domain resources occupied by the first signal belong to a same carrier.

In one embodiment, frequency-domain resources occupied by the second signal and frequency-domain resources occupied by the first signal belong to different BWPs in a same carrier.

In one embodiment, the first signaling is scrambled using the given RNTI, and the second signaling is scrambled using a C-RNTI.

In one embodiment, time-frequency resources occupied by the first signaling belong to a second time-frequency resource pool, and time-frequency resources occupied by the second signaling belong to a first time-frequency resource pool.

In one embodiment, a traffic type of the first signal includes multicast traffics, while a traffic type of the second signal does not include multicast traffics.

In one embodiment, the second signal is a baseband signal.

In one embodiment, the second signal is a radio signal.

In one embodiment, the first signaling and the second signaling are transmitted in a same slot.

In one embodiment, the first signal and the second signal are transmitted in a same slot.

Embodiment 7

Figure 7:
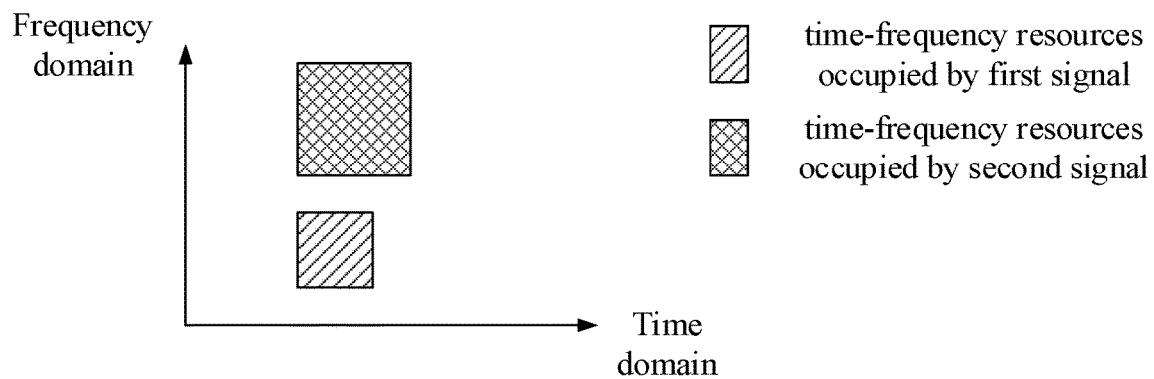
FIG. 7 illustrates a schematic diagram of a first signal and a second signal according to one embodiment of the present disclosure.

Embodiment 7 illustrates a schematic diagram of a first signal and a second signal, as shown in FIG. 7. In FIG. 7, time-domain resources occupied by the first signal and the second signal are overlapping, and the first signal and the second signal are FDM in frequency domain. The first signal is used for multicast/groupcast transmission, while the second signal is used for unicast transmission.

In one embodiment, the first signal and the second signal respectively occupy independent HARQ process numbers.

In one embodiment, the first signal and the second signal respectively occupy different HARQ process numbers.

In one embodiment, the first signal and the second signal occupy the same time-domain resources.

In one embodiment, there is at least one OFDM symbol not belonging to time-domain resources occupied by the first signal and time-domain resources occupied by the second signal simultaneously.

Embodiment 8

Figure 8:
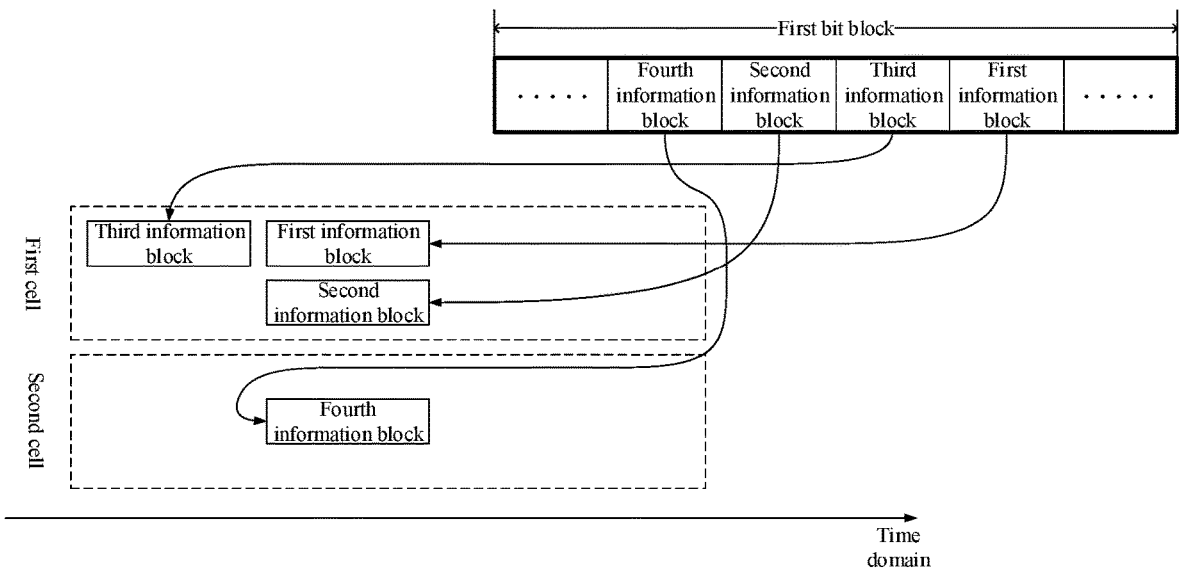
FIG. 8 illustrates a schematic diagram of a first bit block according to one embodiment of the present disclosure.

Embodiment 8 illustrates a schematic diagram of a first bit block, as shown in FIG. 8. In FIG. 8, the first bit block comprises Q1 HARQ-ACK information blocks, and the Q1 HARQ-ACK information blocks are respectively used to indicate whether Q1 first-type signals are correctly received, the Q1 first-type signals comprising the first signal and the second signal; the first signal and the second signal are transmitted in frequency-domain resources corresponding to a first serving cell; the Q1 first-type signals also comprise a third signal and a fourth signal; the third signal is also transmitted in frequency-domain resources corresponding to the first cell, and a time for receiving the third signal is earlier than the first signal; the fourth signal is transmitted in frequency-domain resources corresponding to a second serving cell, and a time for receiving the fourth signal is the same as a time for receiving the first signal; a serving cell identifier of the first cell is smaller than a serving cell identifier of the second cell; among the Q1 HARQ-ACK information blocks there are a third information block and a fourth information block, where the third information block is used to indicate whether the third signal is correctly received, and the fourth information block is used to indicate whether the fourth signal is correctly received.

In one embodiment, the first information block is in lower bits comprised in the first bit block compared with the second information block.

In one embodiment, the first information block is in higher bits comprised in the first bit block compared with the second information block.

In one embodiment, the fourth information block is in lower bits comprised in the first bit block compared with the first information block.

In one embodiment, the fourth information block is in lower bits comprised in the first bit block compared with the second information block.

In one embodiment, the third information block is in higher bits comprised in the first bit block compared with the second information block.

In one embodiment, the third information block is in lower bits comprised in the first bit block compared with the first information block.

Embodiment 9

Figure 9:
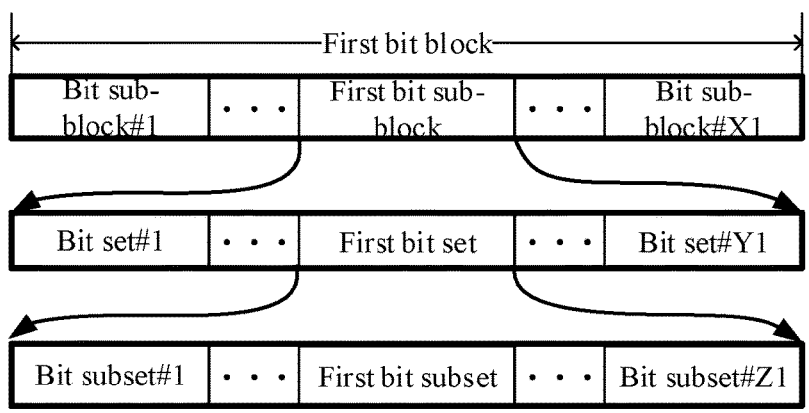
FIG. 9 illustrates a schematic diagram of a first bit block according to another embodiment of the present disclosure.

Embodiment 9 illustrates another schematic diagram of a first bit block, as shown in FIG. 9. In FIG. 9, the first bit block in the present disclosure is comprised of X1 bit sub-blocks (respectively corresponding to bit sub-block #1-bit sub-block #X1 in FIG. 9), X1 being a positive integer greater than 1; the X1 bit sub-blocks are respectively for PDSCHs transmitted in X1 candidate cells, a first bit sub-block is one of the X1 bit sub-blocks that comprises the first information block, and the first bit sub-block is used for feedback of all HARQ-ACKs of PDSCHs transmitted in a candidate cell to which the first signal belongs out of the X1 candidate cells; the first bit sub-block is comprised of Y1 bit sets (respectively corresponding to bit set #1-bit set #Y1 in FIG. 9), Y1 being a positive integer greater than 1; the Y1 bit sets are respectively for all HARQ-ACKs of PDSCHs corresponding to Y1 SPS-PDSCH configurations in a candidate cell to which the first signal belongs, and the first signal adopts a first SPS-PDSCH configuration of the Y1 SPS-PDSCH configurations, the first bit set being used for feedback of all HARQ-ACKs of PDSCHs corresponding to the first SPS-PDSCH configuration in the first candidate cell; the first bit set is comprised of Z1 bit subsets (respectively corresponding to bit subset #1-bit subset #Z1 in FIG. 9), Z1 being a positive integer greater than 1; the Z1 bit subsets are respectively used for feedback of all HARQ-ACKs of Z1 time-domain orthogonal PDSCHs under the first SPS-PDSCH configuration in the first candidate cell.

In one embodiment, any of the X1 bit sub-blocks comprises more than one bit.

In one embodiment, any bit sub-block in the Y1 bit sets comprises more than one bit.

In one embodiment, any bit sub-block in the Z1 bit subsets comprises more than one bit.

In one embodiment, any bit sub-block in the Z1 bit subsets comprises one bit.

In one embodiment, there are at least a first candidate cell and a second candidate cell among the X1 candidate cells, and the first candidate cell and the second candidate cell both correspond to a serving cell to which the first signal belongs, the first candidate cell adopting the first index, the second candidate cell adopting the second index.

In one subembodiment, the second candidate cell is a virtual cell.

In one subembodiment, the second candidate cell is used only for determining the first information block in the first bit block.

In one embodiment, the second index in the present disclosure is used to determine a first bit sub-block out of the X1 bit sub-blocks.

In one embodiment, an SPS-PDSCH configuration employed by the first signal is used to determine a first bit set out of the Y1 bit sets.

In one embodiment, a position of time-domain resources occupied by the first signal is used to determine a first bit subset out of the Z1 bit subsets, the first bit subset being the first information block in the present disclosure.

Embodiment 10

Figure 10:
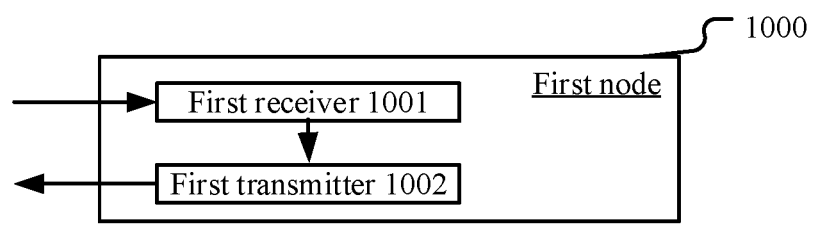
FIG. 10 illustrates a structure block diagram of a processing device in a first node according to one embodiment of the present disclosure.

Embodiment 10 illustrates a structure block diagram of a processing device in a first node, as shown in FIG. 10. In FIG. 10, a first node 1000 comprises a first receiver 1001 and a second transmitter 1002.

The first receiver 1001 receives a first signaling and a first signal;

the first transmitter 1002 transmits a first bit block in a first time-frequency resource set, the first bit block comprising more than one bit.

In Embodiment 10, the first bit block is comprised of more than one bit; the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, a first index is equal to an index of a serving cell to which the first signal belongs, the K1 candidate indexes also comprise a second index, the second index being different from the first index, at least one of a property associated with the first signaling or a property associated with the first signal is used to determine whether the target index is equal to the first index or the second index.

In one embodiment, the property associated with the first signaling comprises an RNTI used for scrambling CRC comprised in the first signaling; the CRC comprised in the first signaling uses a C-RNTI for scrambling and the target index is the first index, or the CRC comprised in the first signaling uses a given RNTI for scrambling and the target index is the second index.

In one embodiment, the property associated with the first signaling comprises a time-frequency resource pool to which time-frequency resources occupied by the first signaling belong; the time-frequency resources occupied by the first signaling belong to a first time-frequency resource pool and the target index is the first index, or the time-frequency resources occupied by the first signaling belong to a second time-frequency resource pool and the target index is the second index; an identifier employed by the first time-frequency resource pool is different from an identifier employed by the second time-frequency resource pool.

In one embodiment, the property associated with the first signal comprises a traffic type of the first signal; the traffic type of the first signal does not comprise multicast traffics and the target index is the first index, or the traffic type of the first signal comprises multicast traffics and the target index is the second index.

In one embodiment, the first bit block comprises Q1 HARQ-ACK information blocks, and the Q1 HARQ-ACK information blocks are respectively used to indicate whether Q1 first-type signals are correctly received, the first signal being one of the Q1 first-type signals, Q1 being a positive integer greater than 1; the target index is used to determine a position of the first information block in the Q1 HARQ-ACK information blocks.

In one embodiment, the first receiver 1001 receives a second signaling and a second signal; the second signaling comprises configuration information of the second signal, the first bit block carries a second information block, and the second information block is used to indicate whether the second signal is correctly received; frequency-domain resources occupied by the second signal and frequency-domain resources occupied by the first signal belong to a same serving cell; there is at least one OFDM symbol belonging to time-domain resources occupied by the first signal and time-domain resources occupied by the second signal simultaneously; the first index is used to determine a position of the second information block in the first bit block.

In one embodiment, the first receiver 1001 receives a third signaling; the third signaling is used to indicate K1 candidate indexes.

In one embodiment, the K1 candidate indexes are respectively equal to K1 integers, the K1 integers are arranged sequentially in an ascending order, and the K1 integers are associated with K1 first-type identifiers; a serving cell to which the first signal belongs comprises K1 spatial resource sets, or a serving cell to which the first signaling belongs comprises K1 spatial resource sets; the K1 spatial resource sets are respectively associated with the K1 first-type identifiers.

In one embodiment, the first receiver 1001 comprises at least the first four of the antenna 452, the receiver 454, the multi-antenna receiving processor 458, the receiving processor 456 and the controller/processor 459 in Embodiment 4.

In one embodiment, the first transmitter 1002 comprises at least the first four of the antenna 452, the transmitter 454, the multi-antenna transmitting processor 457, the transmitting processor 468 and the controller/processor 459 in Embodiment 4.

Embodiment 11

Figure 11:
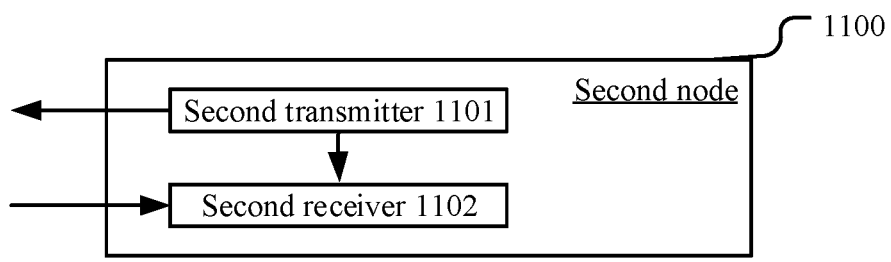
FIG. 11 illustrates a structure block diagram a processing device in a second node according to one embodiment of the present disclosure.

Embodiment 11 illustrates a structure block diagram a processing device in a second node, as shown in FIG. 11. In FIG. 11, a second node 1100 comprises a second transmitter 1101 and a second receiver 1102.

The second transmitter 1101 transmits a first signaling and a first signal;

the second receiver 1102 receives a first bit block in a first time-frequency resource set, the first bit block comprising more than one bit.

In Embodiment 11, the first bit block is comprised of more than one bit; the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes.

In one embodiment, a first index is equal to an index of a serving cell to which the first signal belongs, the K1 candidate indexes also comprise a second index, the second index being different from the first index, at least one of a property associated with the first signaling or a property associated with the first signal is used to determine whether the target index is equal to the first index or the second index.

In one embodiment, the property associated with the first signaling comprises an RNTI used for scrambling CRC comprised in the first signaling; the CRC comprised in the first signaling uses a C-RNTI for scrambling and the target index is the first index, or the CRC comprised in the first signaling uses a given RNTI for scrambling and the target index is the second index.

In one embodiment, the property associated with the first signaling comprises a time-frequency resource pool to which time-frequency resources occupied by the first signaling belong; the time-frequency resources occupied by the first signaling belong to a first time-frequency resource pool and the target index is the first index, or the time-frequency resources occupied by the first signaling belong to a second time-frequency resource pool and the target index is the second index; an identifier employed by the first time-frequency resource pool is different from an identifier employed by the second time-frequency resource pool.

In one embodiment, the property associated with the first signal comprises a traffic type of the first signal; the traffic type of the first signal does not comprise multicast traffics and the target index is the first index, or the traffic type of the first signal comprises multicast traffics and the target index is the second index.

In one embodiment, the first bit block comprises Q1 HARQ-ACK information blocks, and the Q1 HARQ-ACK information blocks are respectively used to indicate whether Q1 first-type signals are correctly received, the first signal being one of the Q1 first-type signals, Q1 being a positive integer greater than 1; the target index is used to determine a position of the first information block in the Q1 HARQ-ACK information blocks.

In one embodiment, the second transmitter 1101 transmits a second signaling and a second signal; the second signaling comprises configuration information of the second signal, the first bit block carries a second information block, and the second information block is used to indicate whether the second signal is correctly received; frequency-domain resources occupied by the second signal and frequency-domain resources occupied by the first signal belong to a same serving cell; there is at least one OFDM symbol belonging to time-domain resources occupied by the first signal and time-domain resources occupied by the second signal simultaneously; the first index is used to determine a position of the second information block in the first bit block.

In one embodiment, the second transmitter 1101 transmits a third signaling; the third signaling is used to indicate K1 candidate indexes.

In one embodiment, the K1 candidate indexes are respectively equal to K1 integers, the K1 integers are arranged sequentially in an ascending order, and the K1 integers are associated with K1 first-type identifiers; a serving cell to which the first signal belongs comprises K1 spatial resource sets, or a serving cell to which the first signaling belongs comprises K1 spatial resource sets; the K1 spatial resource sets are respectively associated with the K1 first-type identifiers.

In one embodiment, the second transmitter 1101 comprises at least the first four of the antenna 420, the transmitter 418, the multi-antenna transmitting processor 471, the transmitting processor 416 and the controller/processor 475 in Embodiment 4.

In one embodiment, the second receiver 1102 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The second node in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, unmanned arial vehicle, test equipment like transceiving device simulating partial functions of base station or signaling tester, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, receiving a first signaling and a first signal, receiving a second signaling and a second signal;
   a first transmitter, transmitting a first bit block in a first time-frequency resource set, the first bit block being comprised of more than one bit;
   wherein the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes; a first index is equal to an index of a serving cell to which the first signal belongs, the K1 candidate indexes also comprise a second index, the second index being different from the first index, at least one of a property associated with the first signaling or a property associated with the first signal is used to determine whether the target index is the first index or the second index; the second signaling comprises configuration information of the second signal, the first bit block carries a second information block, and the second information block is used to indicate whether the second signal is correctly received; frequency-domain resources occupied by the second signal and frequency-domain resources occupied by the first signal belong to a same serving cell; there is at least one OFDM symbol belonging to time-domain resources occupied by the first signal and time-domain resources occupied by the second signal simultaneously; the first index is used to determine a position of the second information block in the first bit block; the first bit block is a piece of Uplink Control Information.

2. The first node according to claim 1, wherein the property associated with the first signaling comprises an RNTI used for scrambling CRC comprised in the first signaling; the CRC comprised in the first signaling uses a C-RNTI for scrambling and the target index is the first index, or the CRC comprised in the first signaling uses a given RNTI for scrambling and the target index is the second index.

3. The first node according to claim 1, wherein the property associated with the first signaling comprises a time-frequency resource pool to which time-frequency resources occupied by the first signaling belong; the time-frequency resources occupied by the first signaling belong to a first time-frequency resource pool and the target index is the first index, or the time-frequency resources occupied by the first signaling belong to a second time-frequency resource pool and the target index is the second index; an identifier employed by the first time-frequency resource pool is different from an identifier employed by the second time-frequency resource pool.

4. The first node according to claim 1, wherein the property associated with the first signal comprises a traffic type of the first signal; the traffic type of the first signal does not comprise multicast traffics and the target index is the first index, or the traffic type of the first signal comprises multicast traffics and the target index is the second index.

5. The first node according to claim 1, wherein the first bit block comprises Q1 HARQ-ACK information blocks, and the Q1 HARQ-ACK information blocks are respectively used to indicate whether Q1 first-type signals are correctly received, the first signal being one of the Q1 first-type signals, Q1 being a positive integer greater than 1; the target index is used to determine a position of the first information block in the Q1 HARQ-ACK information blocks.

6. The first node according to claim 1, wherein the first receiver receives a third signaling; the third signaling is used to indicate K1 candidate indexes.

7. The first node according to claim 1, wherein the K1 candidate indexes are respectively equal to K1 integers, the K1 integers are arranged sequentially in an ascending order, and the K1 integers are associated with K1 first-type identifiers; a serving cell to which the first signal belongs comprises K1 spatial resource sets, or a serving cell to which the first signaling belongs comprises K1 spatial resource sets; the K1 spatial resource sets are respectively associated with the K1 first-type identifiers.

8. The first node according to claim 7, wherein the first signal is associated with a given spatial resource set of the K1 spatial resource sets, or the first signaling is associated with a given spatial resource set of the K1 spatial resource sets; the given spatial resource set correspond to a given first-type identifier of K1 first-type identifiers, the given first-type identifier and an index of a serving cell to which the first signal belongs are used to determine a given integer of the K1 integers that is used by the first signal, and the given integer is equal to a target index employed by the first signal.

9. The first node according to claim 7, wherein the K1 spatial resource sets are respectively K1 CORESETs, and the K1 first-type identifiers are respectively K1 ControlResourceSetIds employed by the K1 CORESETs; or, the K1 spatial resource sets are respectively K1 SearchSpaces, and the K1 first-type identifiers are respectively K1 SearchSpaceIds employed by the K1 SearchSpaces; or, the K1 spatial resource sets are respectively K1 SearchSpace Sets, and the K1 first-type identifiers are respectively K1 SearchSpaceIds employed by the K1 SearchSpace Sets; or, the K1 spatial resource sets are respectively K1 CORESET Pools, and the K1 first-type identifiers are respectively K1 coresetPoolIndexes employed by the K1 CORESET Pools; or, the K1 spatial resource sets are respectively K1 BWPs, and the K1 first-type identifiers are respectively K1 BWP-ids employed by the K1 BWPs.

10. The first node according to claim 1, wherein the first index is a non-negative integer; the first index is a ServCellIndex, or the first index is a ServCellId, or the first index is a ServCellIdentity; the second index is a non-negative integer.

11. The first node according to claim 1, wherein the second index is equal to a sum of the first index and a first integer, the first integer being a non-negative integer greater than 0, the first integer either being fixed or configured by an RRC signaling.

12. The first node according to claim 4, wherein the Q1 first-type signals are sequentially associated with the Q1 HARQ-ACK information blocks in an order of firstly in time domain, then according to SPS PDSCH configuration identifiers and finally according to indexes employed.

13. The first node according to claim 1, wherein time-domain resources respectively occupied by the first signal and the second signal are overlapping, and the first signal and the second signal are FDM in frequency domain; the first signal is used for multicast and groupcast transmissions, while the second signal is used for unicast transmission, the first signal and the second signal respectively occupying independent HARQ-ACK process numbers.

14. The first node according to claim 12, wherein a sum of the given first-type identifier and the index of the serving cell is equal to the given integer.

15. The first node according to claim 12, wherein the phrase that the first signal is associated with a given spatial resource set of the K1 spatial resource sets means that time-frequency resources occupied by the first signal belong to the given spatial resource set.

16. The first node according to claim 12, wherein the phrase that the first signaling is associated with a given spatial resource set of the K1 spatial resource sets means that time-frequency resources occupied by the first signaling belong to the given spatial resource set.

17. A second node for wireless communications, comprising:
- a second transmitter, transmitting a first signaling and a first signal, transmitting a second signaling and a second signal;
- a second receiver, receiving a first bit block in a first time-frequency resource set, the first bit block being comprised of more than one bit;
- wherein the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes; a first index is equal to an index of a serving cell to which the first signal belongs, the K1 candidate indexes also comprise a second index, the second index being different from the first index, at least one of a property associated with the first signaling or a property associated with the first signal is used to determine whether the target index is the first index or the second index; the second signaling comprises configuration information of the second signal, the first bit block carries a second information block, and the second information block is used to indicate whether the second signal is correctly received; frequency-domain resources occupied by the second signal and frequency-domain resources occupied by the first signal belong to a same serving cell; there is at least one OFDM symbol belonging to time-domain resources occupied by the first signal and time-domain resources occupied by the second signal simultaneously; the first index is used to determine a position of the second information block in the first bit block; the first bit block is a piece of Uplink Control Information.

18. A method in a first node for wireless communications, comprising:
- receiving a first signaling and a first signal, receiving a second signaling and a second signal; and
- transmitting a first bit block in a first time-frequency resource set, the first bit block being comprised of more than one bit;
- wherein the first signaling is used to determine time-frequency resources occupied by the first signal, the first bit block comprises a first information block, the first information block is used to indicate whether the first signal is correctly received, and the first information block comprises a positive integer number of bits; the first signaling is used to determine the first time-frequency resource set; an index of a serving cell to which the first signal belongs is equal to a candidate index of K1 candidate indexes, K1 being a positive integer greater than 1; a target index is equal to a candidate index of the K1 candidate indexes, and the target index is used to determine a position of the first information block in the first bit block; at least one of a property associated with the first signaling or a property associated with the first signal is used to determine the target index out of the K1 candidate indexes; a first index is equal to an index of a serving cell to which the first signal belongs, the K1 candidate indexes also comprise a second index, the second index being different from the first index, at least one of a property associated with the first signaling or a property associated with the first signal is used to determine whether the target index is the first index or the second index; the second signaling comprises configuration information of the second signal, the first bit block carries a second information block, and the second information block is used to indicate whether the second signal is correctly received; frequency-domain resources occupied by the second signal and frequency-domain resources occupied by the first signal belong to a same serving cell; there is at least one OFDM symbol belonging to time-domain resources occupied by the first signal and time-domain resources occupied by the second signal simultaneously; the first index is used to determine a position of the second information block in the first bit block; the first bit block is a piece of Uplink Control Information.

\* \* \* \* \*